Patented May 1, 1923.

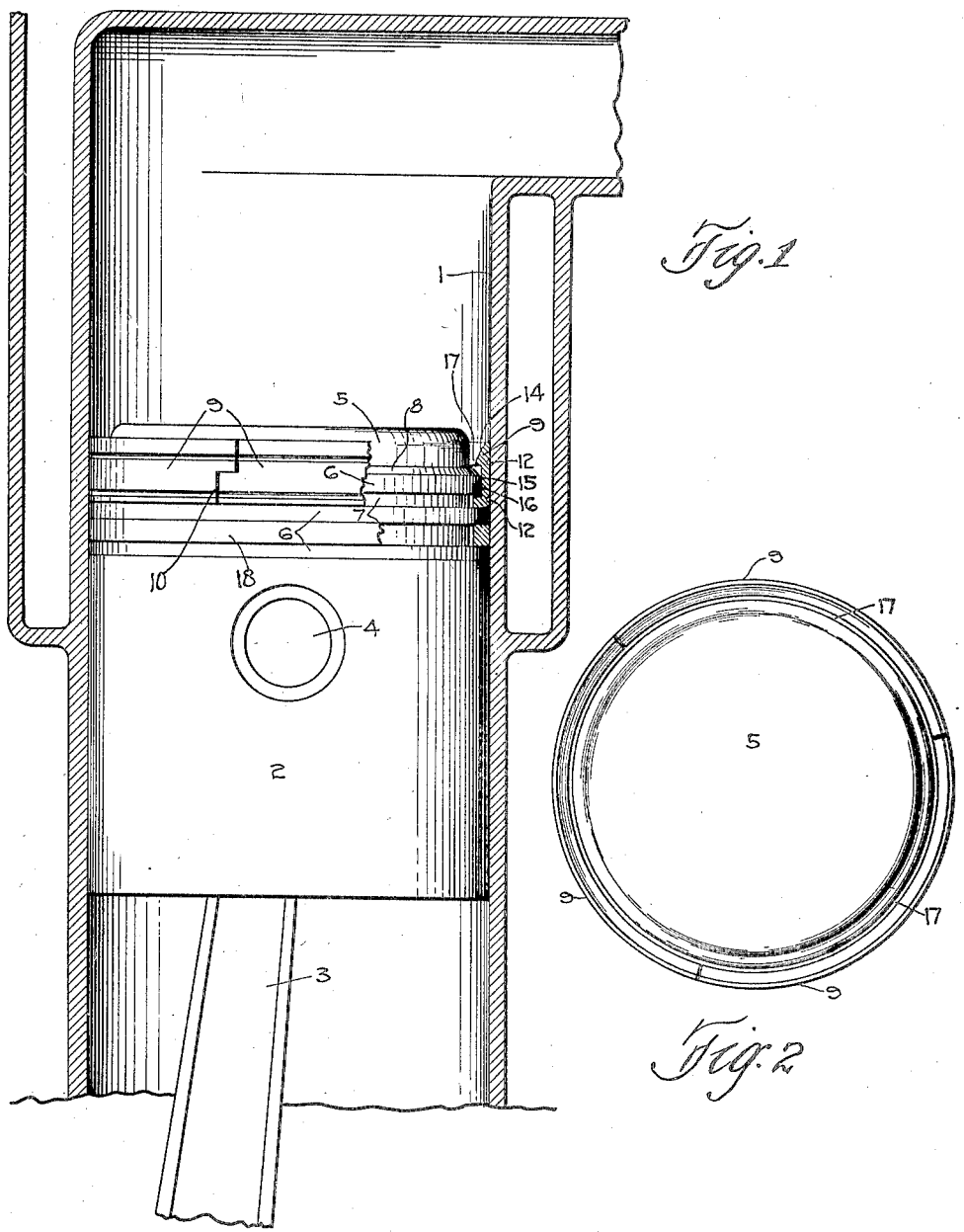

1,453,448

UNITED STATES PATENT OFFICE.

WILLIAM R. DAY, OF CLEVELAND, OHIO.

PISTON AND PISTON RING.

Application filed December 31, 1920. Serial No. 434,219.

*To all whom it may concern:*

Be it known that I, WILLIAM R. DAY, a citizen of the United States, residing at Cleveland, in the county of Cuyahoga and State of Ohio, have invented a certain new and useful Improvement in Pistons and Piston Rings, of which the following is a full, clear, and exact description, reference being had to the accompanying drawings.

This invention relates to improvements in piston and piston ring construction and while adapted to practically any apparatus wherein these elements are present it has particular reference to their use in connection with internal combustion engines.

Some of the objects of the present invention are to provide a piston and ring which shall form a tight seal at all times with the cylinder wall but which shall be particularly effective on the compression and power stroke of the piston; to provide a ring which shall be formed of a plurality of segmental sections so mounted as to allow the ring perfect freedom of expansion in all directions, rendering it passive and dependent for its expansion on the pressure within the cylinder, the ring and piston being so formed and related as permit access of the pressure to the entire inner surface of the ring, the sectional feature furthermore facilitating the removal and replacement of the ring as occasion shall require; to provide a sectional ring wherein the sections are interchangeable; to provide a sectional ring wherein the sections are formed to overlap and engage at their ends with circumferentially disposed sealing surfaces whereby leak proof joints are formed between the relatively movable sections; to provide a trunk piston and ring construction for gas engines through which the "whip" action of the piston common in engines of the aforesaid class is eliminated; to provide a ring which, because of its effective sealing nature on the compression and power stroke of the piston, shall be admirably adapted for use with pistons having a different coefficient of expansion than the cylinder wall, such as aluminum pistons or any of the various alloys thereof; to provide a piston and ring which shall be simple in construction and inexpensive to manufacture, while further objects and advantages will appear as the description proceeds.

In the accompanying drawing wherein I have shown one form of my invention but without intent to limit myself thereto, Fig. 1 is a sectional view through a portion of a cylinder of an internal combustion engine fitted with my piston and ring; and Fig. 2 is a top plan view of my piston with the ring applied thereto.

Describing by reference characters the various parts illustrated, 1 indicates the cylinder of an internal combustion engine wherein the piston 2 is adapted to operate, said piston being provided with the usual connecting rod 3 and wrist pin 4 for transmitting the power to the crank shaft (not shown). In carrying out my invention, I preferably form the piston 2 with a head portion 5 of reduced diameter and also with a plurality of spaced flanges 6 which define the ring receiving grooves 7. The flange 6 adjacent the head 5 is preferably beveled on its upper edge as indicated at 8 and said flange is also of a diameter less than the diameter of the piston proper so that a sectional ring 9 may be positioned thereabout and contact with the cylinder wall. In practice I form the ring 9 of a plurality of segments, preferably interchangeable, three such segments being shown in the present instance, and the ends of each segment are formed with circumferentially disposed sealing surfaces that engage the corresponding surfaces of adjoining segments, as indicated at 10, to permit expansion and contraction of the ring without permitting the gases to pass thereby. The outer surface of the ring is adapted to contact with the cylinder wall and is provided with suitable oil grooves 12. The inner surface of the ring is formed adjacent the upper edge with a beveled surface 14 and directly below with a groove 15 into which the beveled flange 6 is adapted to fit loosely, there being a small passageway 16 formed between the extreme outer surface of the beveled flange 6 and the groove 15 by virtue of the slight difference in their diameters. It will also be noted that the lower and inwardly directed edge of the beveled surface 14 is spaced a small distance from the piston as indicated at 17 thereby permitting the engine gases on the compression and power strokes and also to a certain extent on the exhaust stroke to exert a pressure on the beveled surface 14 and to flow into the passage way 16 to force the segments of the ring radially into contact with the wall of the cylinder. The presence of the oil between the ring segments and cylinder wall causes the former to effectually adhere to the latter during the inhalation stroke. A ring 18 of any approved construction may be positioned in the lower groove 7 if desired.

It will thus be apparent that I have provided a ring which will form a tight seal about the piston whenever the gases thereabove are compressed to any extent, and the greater the compression the more effective my ring will seal the cylindrical surface of the piston. While I have shown my ring composed of three segments it will be understood that any number of segments may be used although I preferably form said ring with at least three such segments in order to allow the ring freedom of radial expansion.

Since the ring will be in closest contact with the cylinder on the compression and power strokes of the piston and somewhat less on the exhaust stroke, it will be obvious that the frictional contact therebetween will be at a minimum on the intake stroke and hence the piston acceleration will be more uniform on all strokes than is the case with the usual form of split ring now commonly used. It is also obvious that on the power and compression strokes and more or less on the exhaust stroke, the ring will tend somewhat to wipe the oil from the cylinder wall but on the intake stroke the oil film will be again spread evenly since the ring is not in such close contact with the cylinder wall, it being held thereagainst by adhesion, as above mentioned. It is thus possible to provide a ring which forms a tighter seal when such seal is needed than is possible with the usual split ring which exerts a constant pressure and does not provide a stroke or strokes when the cylinder can be lubricated properly to overcome the wiping action due to such close contact.

Attention is called to the fact that the lower flange of the ring has a loose fit in the groove 7 which it occupies, so that the ring is capable of a very slight movement longitudinally of the piston. On all except the intake stroke, the ring seats firmly against the bottom of the groove, because of the pressure of the gases on the ring, producing a seal which prevents the compressed gases from passing the ring while giving them access to the entire inner surface of the ring, causing it to expand uniformly throughout its vertical as well as its circumferential extent. There is no tendency for the ring segments to tilt or keel outwardly at their upper edges due to unbalanced pressure on their inner sides. During the inhalation stroke, the ring is sucked upwardly and the lower flange thereof seats against the top wall of the groove sealing the joint produced thereby against the passage of oil into the space above the piston, effectually preventing oil pumping. Moreover, this action reduces the area of the inner surface of the ring that is subjected to the suction produced during the intake stroke, so that there is less tendency for the ring segments to leave the cylinder wall.

By the ring's being located as near as practicable to the upper end of the piston, and by reason of the fact that it is passive and therefore instantaneous in its response to the built up pressure, it steadies the piston and centralizes it within the cylinder, preventing the annoying "whip" action so frequent in engines employing the trunk type of pistons.

Having thus described my invention, what I claim is:—

1. In an apparatus of the character set forth, the combination of a piston adapted to operate within a cylinder, the head of said piston being reduced in diameter and the walls of said piston adjacent said head being provided with a plurality of flanges arranged in spaced relationship and defining grooves, rings fitted in said grooves, the ring fitted in the groove adjacent said reduced head being composed of a plurality of segments each movable radially independently of the other, each of said segments extending to a point adjacent the reduced portion of said piston head, and the edge of the flange adjacent said piston head being bevelled.

2. In an apparatus of the character set forth, the combination of a piston adapted to operate within a cylinder, the head of said piston being reduced in diameter and the walls of said piston adjacent said head being provided with a plurality of flanges defining grooves, the flange adjacent said piston head being reduced in diameter, a segmental ring fitted in one of said grooves and loosely embracing said reduced flange and extending to a point adjacent the reduced portion of said piston head, and the edge of said reduced flange adjacent the reduced portion of said piston head being bevelled.

3. In an apparatus of the character set forth, the combination of a piston adapted to operate within a cylinder, the head of said piston being reduced in diameter and the walls of said piston adjacent said head being provided with a plurality of flanges defining grooves, the flange adjacent said piston head being reduced in diameter, a segmental ring fitted in one of said grooves and embracing said reduced flange and extending to a point adjacent the reduced portion of said piston head, said ring being spaced from said flange and said piston head, and the edge of said reduced flange adjacent the reduced portion of said piston head being bevelled.

In testimony whereof, I hereunto affix my signature.

WILLIAM R. DAY.